US008529043B2

(12) United States Patent
Kakutani

(10) Patent No.: US 8,529,043 B2
(45) Date of Patent: Sep. 10, 2013

(54) PRINTING APPARATUS

(75) Inventor: Toshiaki Kakutani, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 409 days.

(21) Appl. No.: 12/383,988

(22) Filed: Mar. 30, 2009

(65) Prior Publication Data

US 2009/0244137 A1 Oct. 1, 2009

(30) Foreign Application Priority Data

Mar. 28, 2008 (JP) ................................. 2008-085944

(51) Int. Cl.
*G01D 11/00* (2006.01)

(52) U.S. Cl.
USPC .............................. 347/100; 347/101; 347/15

(58) Field of Classification Search
USPC ................. 347/5, 9, 12, 101, 14, 15, 100, 43; 428/195.1
See application file for complete search history.

(56) References Cited

U.S. PATENT DOCUMENTS 5,846,306 A * 12/1998 Kubota et al. .............. 106/31.75
6,102,537 A * 8/2000 Kato et al. .................... 347/101
6,902,249 B2 * 6/2005 Suzuki et al. ................... 347/15
7,407,277 B2 8/2008 Yoneyama
7,562,957 B2 7/2009 Mills et al.
7,891,799 B2 * 2/2011 Edwards et al. .............. 347/100
2005/0001878 A1 1/2005 Yamasaki et al.
2009/0214833 A1 * 8/2009 Oyanagi et al. ............ 428/195.1

FOREIGN PATENT DOCUMENTS

JP 2001-138629 A 5/2001
JP 2004-322638 A 11/2004
JP 2005-144749 A 6/2005
JP 2006-050347 2/2006
JP 2007-050555 3/2007

* cited by examiner

*Primary Examiner* — Lam S Nguyen
(74) *Attorney, Agent, or Firm* — Nutter McClennen & Fish LLP; John J. Penny, Jr.; Christina M. Sperry

(57) ABSTRACT

Printing apparatuses are provided. In one embodiment, a printing apparatus includes a head, a transport mechanism, and a print control section. The head has at least one special ink nozzle that ejects special ink on a printing medium and at least one ordinary ink nozzle that ejects ordinary ink on the printing medium. The transport mechanism transports the printing medium relative to the head. The print control section controls the head and the transport mechanism, thereby printing an image on the printing medium using the special ink and the ordinary ink. The at least one special ink nozzle and the at least one ordinary ink nozzle are offset from each other along a direction in which the printing medium is transported and are arranged in the order in which dots of the special ink and dots of the ordinary ink are superimposed.

7 Claims, 14 Drawing Sheets

MAIN SCANNING NUMBER
1 2 3 4 5 6 7 8 9 10 11
FEED IN SUBSCANNING DIRECTION: 3 DOTS
COLOR NOZZLE GROUP
METALLIC NOZZLE GROUP

ORDER OF DOT FORMATION BY METALLIC NOZZLE GROUP
MAIN SCANNING DIRECTION
SUBSCANNING DIRECTION

ORDER OF DOT FORMATION BY COLOR NOZZLE GROUP
MAIN SCANNING DIRECTION
SUBSCANNING DIRECTION

SIZE OF METALLIC DOTS

SIZE OF COLOR DOTS

PRINTING APPARATUS

BACKGROUND

1. Technical Field

The present invention relates to a technique to superimpose dots of special ink on at least some of dots of ordinary ink.

2. Related Art

Hitherto, in the field of electrophotography, there has been proposed a technique in which, for an area with respect to which metallic color is specified, a solid layer of metallic toner is formed and then a fine or coarse process color toner layer is formed on it (see JP-A-2006-50347). In this technique, by superimposing a process color toner layer on a metallic toner layer, various tones of metallic color are reproduced.

Color printing techniques using toner include a tandem method and a four-cycle method. In both methods, printing is performed by superimposing respective colors of toners. Therefore, it is relatively easy to superimpose process color toner on metallic toner.

However, in the field of ink jet printers, respective colors of inks are ejected almost simultaneously from a head onto a printing medium, and thereby printing is performed. Therefore, if a special ink, such as a metallic ink, and an ordinary color ink are ejected simultaneously, the inks are mixed on a printing medium, and intended gloss and color cannot be obtained. To avoid such a problem, it is possible to divide the ink jet printing process into a process of printing in special ink and a process of printing in ordinary ink and to superimpose them. However, this can cause new problems such as decrease in printing speed, increase in man-hour, and misalignment between the first printing and the second printing.

SUMMARY

In a printing method in which ink is ejected and thereby an image is printed, when printing is performed using special ink, such as metallic ink, and color ink, the invention prevents the color development of respective colors from deteriorating.

According to an aspect of the invention, a printing apparatus forms dots of special ink and dots of ordinary ink on a printing medium, at least some of the dots of ordinary ink being superimposed on the dots of special ink, or the dots of special ink being superimposed on at least some of the dots of ordinary ink. The printing apparatus includes a head, a transport mechanism, and a print control section. The head has at least one special ink nozzle that ejects the special ink and at least one ordinary ink nozzle that ejects the ordinary ink. The transport mechanism transports the printing medium relative to the head. The print control section controls the head and the transport mechanism, thereby printing an image on the printing medium using the special ink and the ordinary ink. The at least one special ink nozzle and the at least one ordinary ink nozzle are offset from each other along the direction in which the printing medium is transported and are arranged in the order in which the dots of special ink and the dots of ordinary ink are superimposed.

In such a printing apparatus, the at least one special ink nozzle and the at least one ordinary ink nozzle are offset from each other along the direction in which the printing medium is transported and are arranged in the order in which the dots of special ink and the dots of ordinary ink are superimposed. Since special ink and ordinary ink can be ejected in a temporally offset manner, drying of the ink ejected first can be promoted. As a result, even if special ink and ordinary ink are superimposed, the color development of these inks can be prevented from deteriorating.

Ordinary ink is ink essential for printing a color or monotone image, for example, color ink such as cyan ink, magenta ink, or yellow ink, or black ink. On the other hand, special ink is not essential for printing an ordinary color or monotone image, and it produces some kind of special effect on an image. Examples of special ink include metallic ink, white ink, and transparent ink.

It is preferable that the head have at least one nozzle row for the special ink and at least one nozzle row for the ordinary ink, each nozzle row including a plurality of nozzles arranged in the direction in which the printing medium is transported, some of the nozzles in the at least one nozzle row for the special ink be used as the at least one special ink nozzle and form a special ink nozzle group, some of the nozzles in the at least one nozzle row for the ordinary ink be used as the at least one ordinary ink nozzle and form an ordinary ink nozzle group, and the special ink nozzle group and the ordinary ink nozzle group be offset from each other along the direction in which the printing medium is transported and be arranged in the order in which the dots of special ink and the dots of ordinary ink are superimposed.

In such a printing apparatus, the special ink nozzle group and the ordinary ink nozzle group are offset from each other along the direction in which the printing medium is transported. By using an existing head having a plurality of nozzles, the arrangement of special ink nozzles can be offset from the arrangement of ordinary ink nozzles.

It is preferable that the number of the at least one special ink nozzle be different from the number of the at least one ordinary ink nozzle. When the printing, for example, in ordinary ink is required to be performed at high speed, such a printing apparatus can be provided with many nozzles for ordinary ink.

It is preferable that the number of the at least one special ink nozzle be smaller than the number of the at least one ordinary ink nozzle. Such a printing apparatus can improve the printing speed in a part in which ordinary ink is used.

It is preferable that the print control section make the manner of dot formation in an area in which printing is performed using the special ink different from the manner of dot formation in an area in which printing is performed using the ordinary ink. Such a printing apparatus can change the manner of dot formation, for example, depending on the use application of special ink or ordinary ink.

It is preferable that the print control section make the output resolution of the area in which printing is performed using the special ink lower than the output resolution of the area in which printing is performed using the ordinary ink.

When an area in which printing is performed using special ink does not require high image quality, such a printing apparatus can reduce the output resolution of such an area. Reducing the output resolution in an area in which printing is performed using special ink can reduce the usage of special ink.

It is preferable that the printing apparatus further include a main scanning mechanism that drives the head in a main scanning direction perpendicular to the direction in which the printing medium is transported, and that the print control section be capable of superimposing scanning in which the main scanning mechanism makes the head perform main scanning a plurality of times to form a raster of dots, and that the print control section make the number of times of main scanning in forming a raster of dots using the special ink smaller than the number of times of main scanning in forming a raster of dots using the ordinary ink.

Such a printing apparatus can reduce the number of times of main scanning in the area in which printing is performed using special ink and therefore can improve the printing speed. In addition, such a printing apparatus can make banding in the area in which printing is performed using ordinary ink less likely to occur than in the area in which printing is performed using special ink.

It is preferable that the head can form different sizes of dots of the special ink and different sizes of dots of the ordinary ink, and that the print control section form large-sized dots in the area in which printing is performed using the special ink.

Such a printing apparatus forms large-sized dots in the area in which printing is performed using special ink, and therefore the effect of special ink in image quality can be improved. In addition, for example, when the output resolution in the area in which printing is performed using special ink is reduced, if the size of dots of special ink is increased, due to dot gain, special ink can be intentionally made to run. Thus, printing in special ink can be performed in such a manner that the reduction in output resolution is compensated for.

It is preferable that the number of the at least one nozzle row for the special ink be larger than the number of the at least one nozzle row for the ordinary ink. Such a printing apparatus can improve the printing speed in the area in which printing is performed using special ink.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Outline of Embodiment

Figure 1:
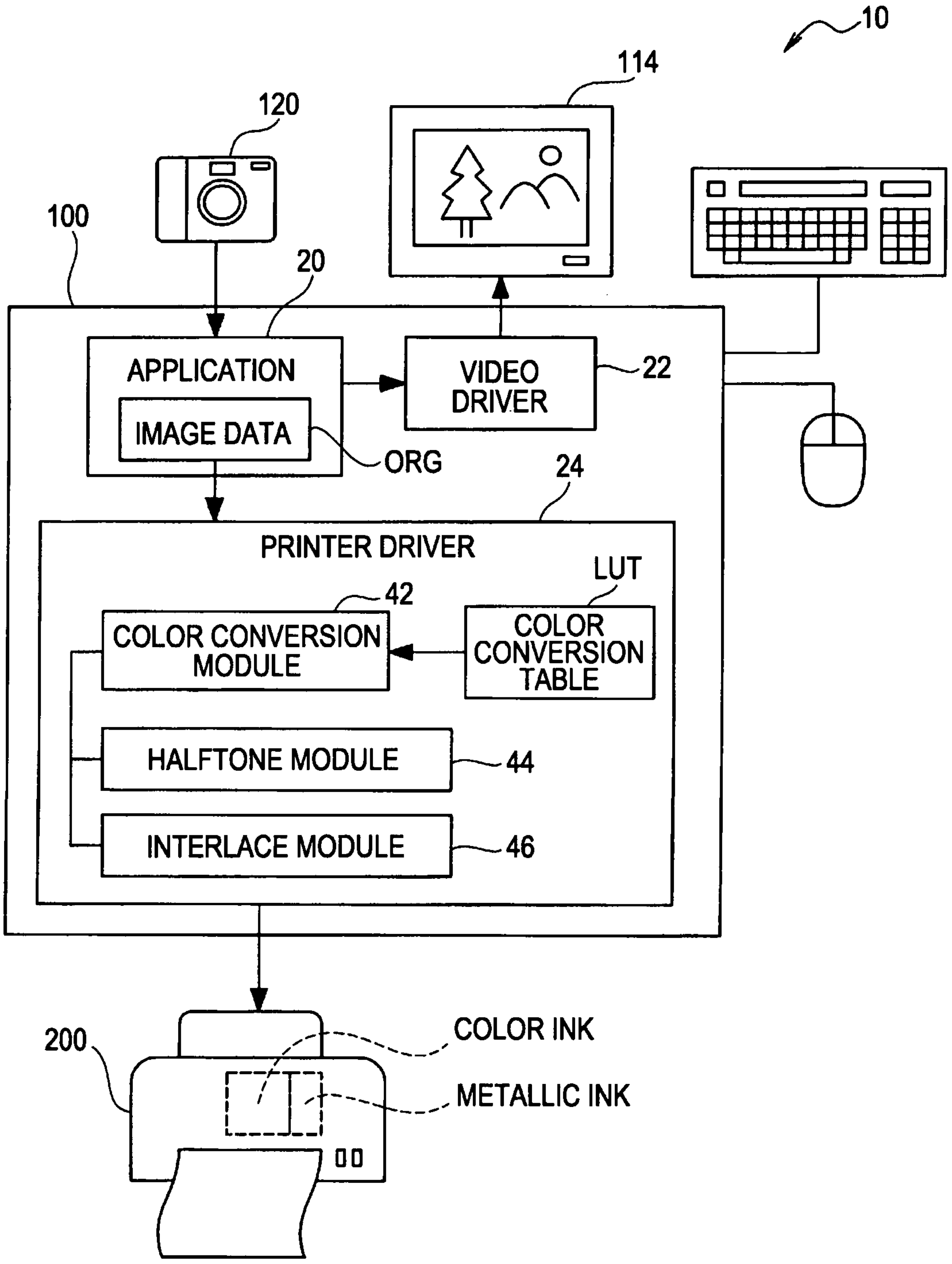
FIG. 1 is a schematic configuration diagram of a printing system 10.

FIG. 1 is a schematic configuration diagram of a printing system 10 according to an embodiment of the invention. As shown, the printing system 10 of this embodiment includes a computer 100 serving as a print control unit, and a printer 200 that prints an image under the control of the computer 100. The printing system 10 as a whole functions as a printing apparatus in a broad sense.

The printer 200 of this embodiment is provided with cyan ink (C), magenta ink (M), yellow ink (Y), and black ink (K) as color ink and, in addition, glossy metallic ink (S). In this embodiment, pigment-based ink is used as color ink. Examples of metallic ink include an ink composition that includes pigment, organic solvent, and fixing resin, the pigment being composed of metallic foil pieces having an average thickness of at least 30 nm but no more than 100 nm, a 50% volume average particle diameter of at least 1.0 μm but no more than 4.0 μm, and a maximum particle diameter in particle size distribution of no more than 12 μm. In this embodiment, the term "color ink" includes black ink.

The computer 100 has a predetermined operating system installed thereon. Under this operating system, an application program 20 runs. Into the operating system, a video driver 22 and a printer driver 24 are built. The application program 20 inputs image data ORG, for example, through a peripheral interface 108, from a digital camera 120. Then, the application program 20 displays an image represented by the image data ORG on a display 114 through the video driver 22. In addition, the application program 20 outputs the image data ORG to the printer 200 through the printer driver 24. The image data ORG that the application program 20 inputs from the digital camera 120 is composed of three color components of red (R), green (G), and blue (B).

The application program 20 of this embodiment can specify an area composed of color components of R, G, and B (hereinafter referred to as "color area") and an area of metallic color (hereinafter referred to as "metallic area") with respect to any area in the image data ORG. The metallic area and the color area may be superimposed. That is, respective areas may be specified in such a manner that a color image is formed on a metallic color background.

The printer driver 24 has a color conversion module 42, a halftone module 44, and an interlace module 46. The color conversion module 42 converts color components R, G, and B of the color area in the image data ORG into color components that the printer 200 can express (cyan (C), magenta (M), yellow (Y), and black (B)) according to a preliminarily provided color conversion table LUT.

The halftone module 44 performs halftone processing in which the gradations of the color area color-converted by the color conversion module 42 and the metallic area are expressed in distribution of dots. In this embodiment, a known ordered dither method is used for the halftone processing. Instead of an ordered dither method, another halftone technique such as an error diffusion method or a density pattern method can be used for the halftone processing.

The data obtained through the halftone processing and representing the arrangement of respective colors of dots, are rearranged by the interlace module 46 according to the order in which the head 241 of the printer 200 forms dots. Such processing is referred to as interlace processing. The data obtained through the interlace processing are output as image data to the printer 200 by the printer driver 24.

B. Apparatus Configuration

Figure 2:
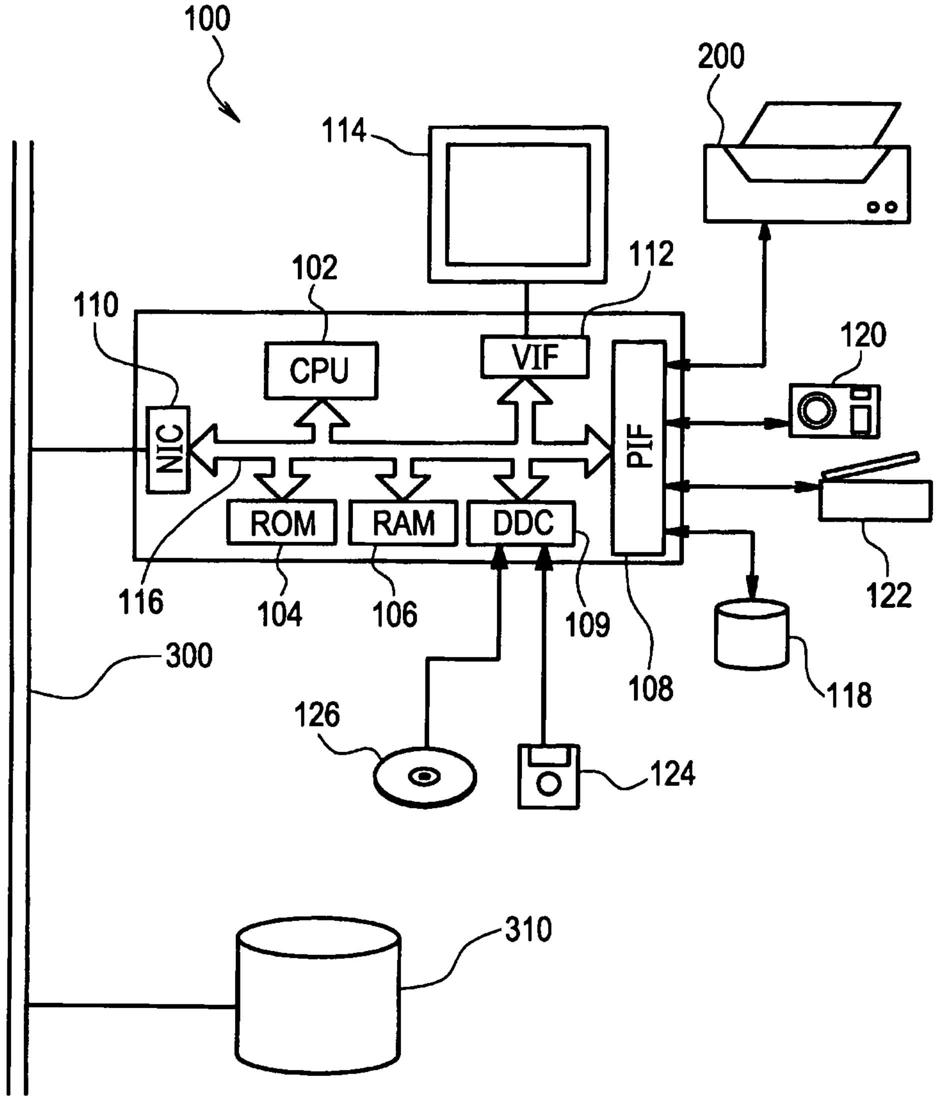
FIG. 2 is a configuration diagram of a computer 100 serving as a print control unit.

FIG. 2 is a configuration diagram of the computer 100 serving as a print control unit. The computer 100 is a known computer configured by connecting a CPU 102, a ROM 104, a RAM 106, and so forth using buses 116.

The computer 100 is connected to a disk controller 109 for reading data from a flexible disk 124, a compact disk 126, or the like, a peripheral interface 108 for exchanging data with peripherals, and a video interface 112 for driving a display 114. The peripheral interface 108 is connected to a printer 200 and a hard disk 118. If a digital camera 120 or a color scanner 122 is connected to the peripheral interface 108, images taken using the digital camera 120 or the color scanner 122 can be processed. If a network interface card 110 is installed, the computer 100 can be connected to a communication line 300, and data stored in a storage unit 310 connected to the communication line 300 can be obtained. The computer 100, after obtaining image data to be printed, controls the printer 200 and prints the image data using the printer driver 24.

Figure 3:
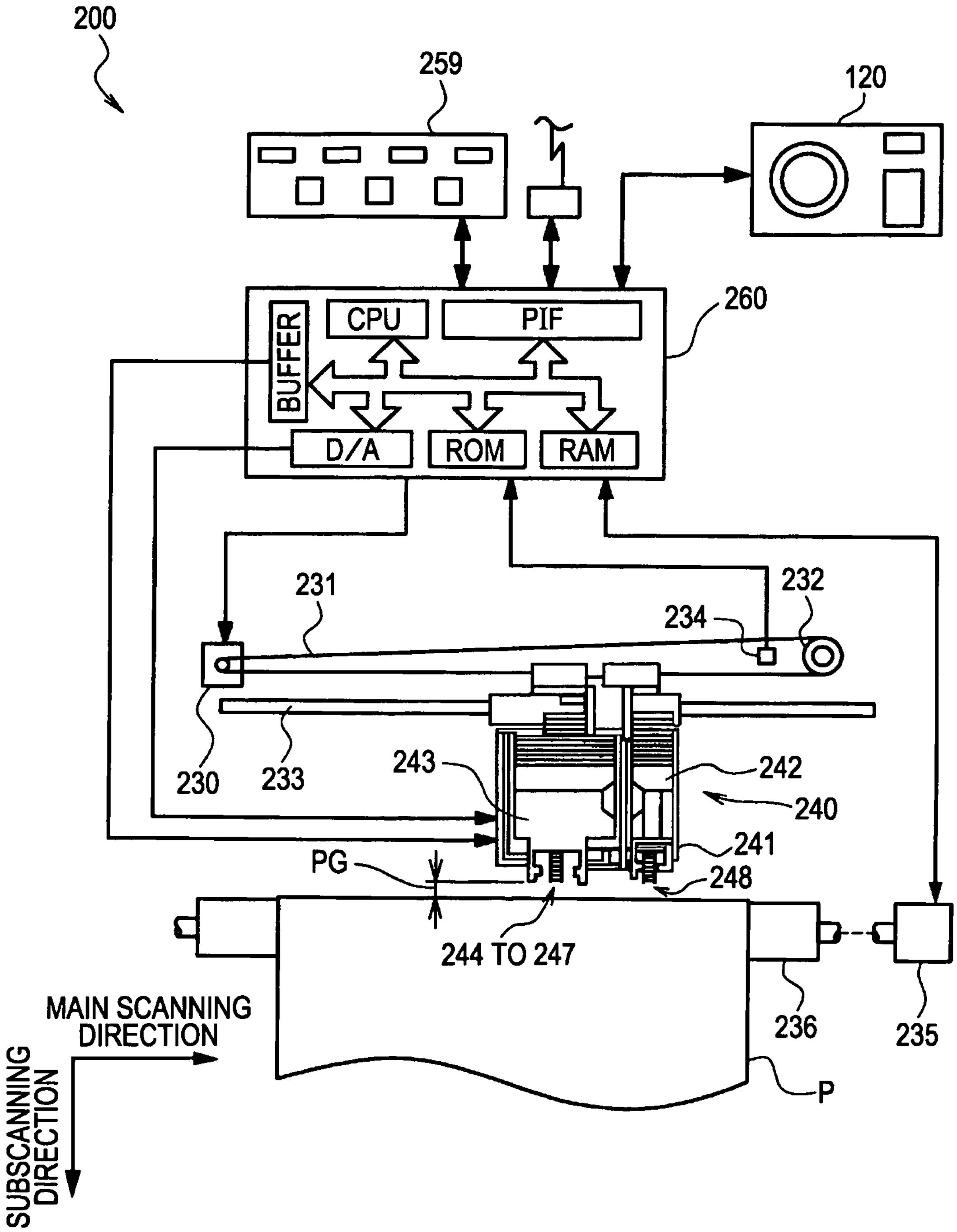
FIG. 3 is a configuration diagram of a printer 200.

Next, the configuration of the printer 200 will be described with reference to FIG. 3. As shown in FIG. 3, the printer 200 includes a transport mechanism that transports a printing medium P using a paper feed motor 235, a main scanning mechanism that reciprocates a carriage 240 in the direction of the shaft of a platen 236 using a carriage motor 230, a mechanism that drives a head 241 mounted on the carriage 240 and performs ink ejection and dot formation, and a control circuit 260 that controls signal exchange with the paper feed motor 235, the carriage motor 230, the head 241, and an operation panel 256.

The main scanning mechanism that reciprocates the carriage 240 in the direction of the shaft of the platen 236 includes a sliding shaft 233, a pulley 232, and a position detecting sensor 234. The sliding shaft 233 is provided parallel to the shaft of the platen and slidably supports the carriage 240. An endless driving belt 231 is provided in a tensioned state between the carriage motor 230 and the pulley 232. The position detecting sensor 234 detects the origin position of the carriage 240.

On the carriage 240 is mounted a color ink cartridge 243 that contains cyan ink (C), magenta ink (M), yellow ink (Y), and black ink (B). On the carriage 240 is also mounted a metallic ink cartridge 242 that contains metallic ink (S). The head 241 provided in the lower part of the carriage 240 has nozzle rows 244 to 248 that eject respective colors of inks. Mounting the ink cartridges 242 and 243 on the carriage 240 from above enables the cartridges to supply ink to the nozzle rows 244 to 248.

Figure 4:
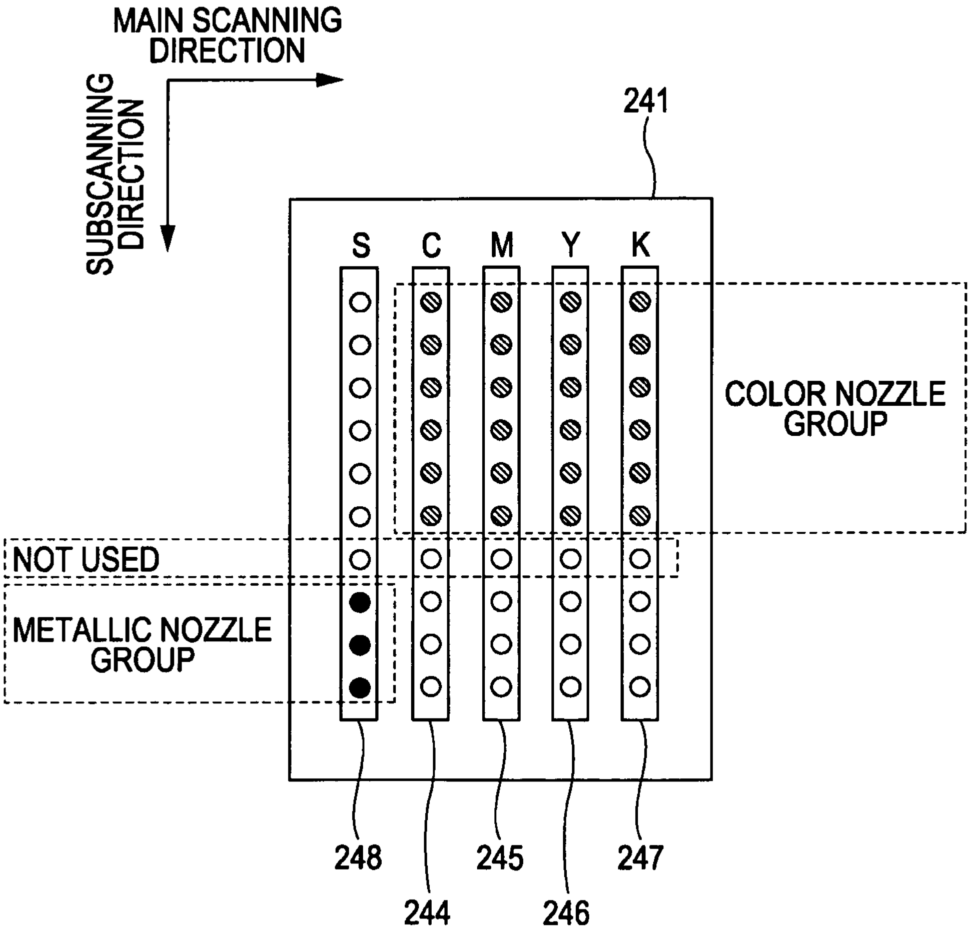
FIG. 4 shows the arrangement of nozzles formed in the lower surface of a head 241.

FIG. 4 shows the arrangement of nozzles formed in the lower surface of the head 241. As shown, in this embodiment, for each of the metallic ink (S), cyan ink (C), magenta ink (M), yellow ink (Y), and black ink (B), 10 nozzles are arranged in the subscanning direction in the lower surface of the head 241. The nozzles are arranged at intervals of two dots in the subscanning direction. In the figure, the subscanning direction is downward. So, at the time of printing, the lowermost nozzles pass over a printing medium first. In the figure, black circles denote nozzles that eject metallic ink, and hatched circles denote nozzles that eject color ink. The other circles denote nozzles that are not used.

As shown in FIG. 4, in this embodiment, for the metallic ink nozzle row 248, of 10 nozzles, the first three nozzles that pass over a printing medium are used at the time of printing, and the other seven are not used. For each of the color ink nozzle rows 244 to 247, of 10 nozzles, the first four nozzles that pass over a printing medium are not used, and the other six are used. Thus, in every nozzle row, the fourth nozzle from the first nozzle that passes over a printing medium is not used. Hereinafter, nozzles that eject metallic ink will be referred to as metallic nozzle group, and nozzles that eject color ink will be referred to as color nozzle group.

Each nozzle shown in FIG. 4 has a piezoelectric element built therein. As is well known, when a voltage is applied to a piezoelectric element, the crystal structure of the piezoelectric element warps, and the piezoelectric element extremely rapidly performs electromechanical energy conversion. In this embodiment, a predetermined voltage signal is applied to a piezoelectric element, and thereby one side wall of an ink channel in a nozzle is deformed, and thereby an ink droplet is ejected from the nozzle. In this embodiment, as described above, ink is ejected using a piezoelectric element. Instead, ink may be ejected by generating a bubble in a nozzle.

As shown in FIG. 3, the control circuit 260 of the printer 200 is configured by connecting the CPU, ROM, RAM, PIF (peripheral interface), and so forth with each other via buses. The control circuit 260 controls the operation of the carriage motor 230 and the paper feed motor 235 and thereby controls the main scanning operation and subscanning operation of the carriage 240. Upon receiving print data output from the computer 100 through the PIF, the control circuit 260 supplies the head 241 with a drive signal based on the print data and drives the head 241 in a synchronized manner with the main scanning or subscanning movement of the carriage 241.

The printer 200 having the above hardware configuration drives the carriage motor 230, thereby reciprocating the nozzle rows 244 to 247 for ejecting respective colors of inks relative to a printing medium P in the main scanning direction, and drives the paper feed motor 235, thereby moving the printing medium P in the subscanning direction. The control circuit 260 drives the nozzles at an appropriate time on the basis of the print data in a synchronized manner with the reciprocating movement of the carriage 240 (main scanning) and the movement of the printing medium P (subscanning), thereby forming appropriate colors of ink dots at appropriate positions on the printing medium P. In this way, the printer 200 can print a color image on the printing medium P. Instead of transporting a printing medium in the subscanning direction as in this embodiment, the carriage 240 may be transported in the subscanning direction with a printing medium fixed.

C. Printing Processing

Figure 5:
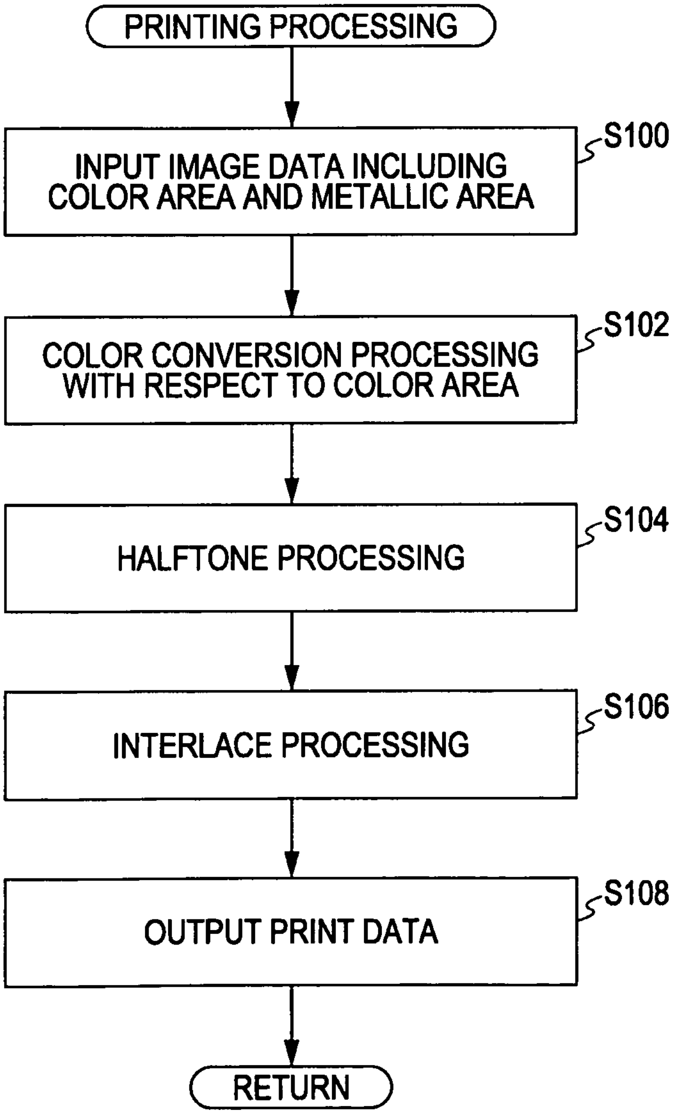
FIG. 5 is a flow chart of the printing processing.

Next, the printing processing that the computer 100 executes using the printer driver 24 will be described. FIG. 5 is a flow chart of the printing processing in this embodiment. At the start of the printing processing, the computer 100 inputs image data in which a metallic area and a color area are specified, using the printer driver 24, from the application program 20 (step S100).

After inputting image data, with respect to the color area in the image data, the computer 100 converts RGB image data into CMYK image data (step S102). After obtaining CMYK image data, the computer 100 performs halftone processing using the halftone module 44 with respect to the color area and the metallic area (step S104).

After the halftone processing, the computer 100 performs interlace processing using the interlace module 46 (step S106). After performing interlace processing, the computer 100 outputs print data obtained through the interlace processing to the printer 200 (step S108), and terminates the printing processing. The printer 200, upon receiving print data from the computer 100, forms dots on a printing medium according to the print data.

Figures 6A, 6B, 6C:
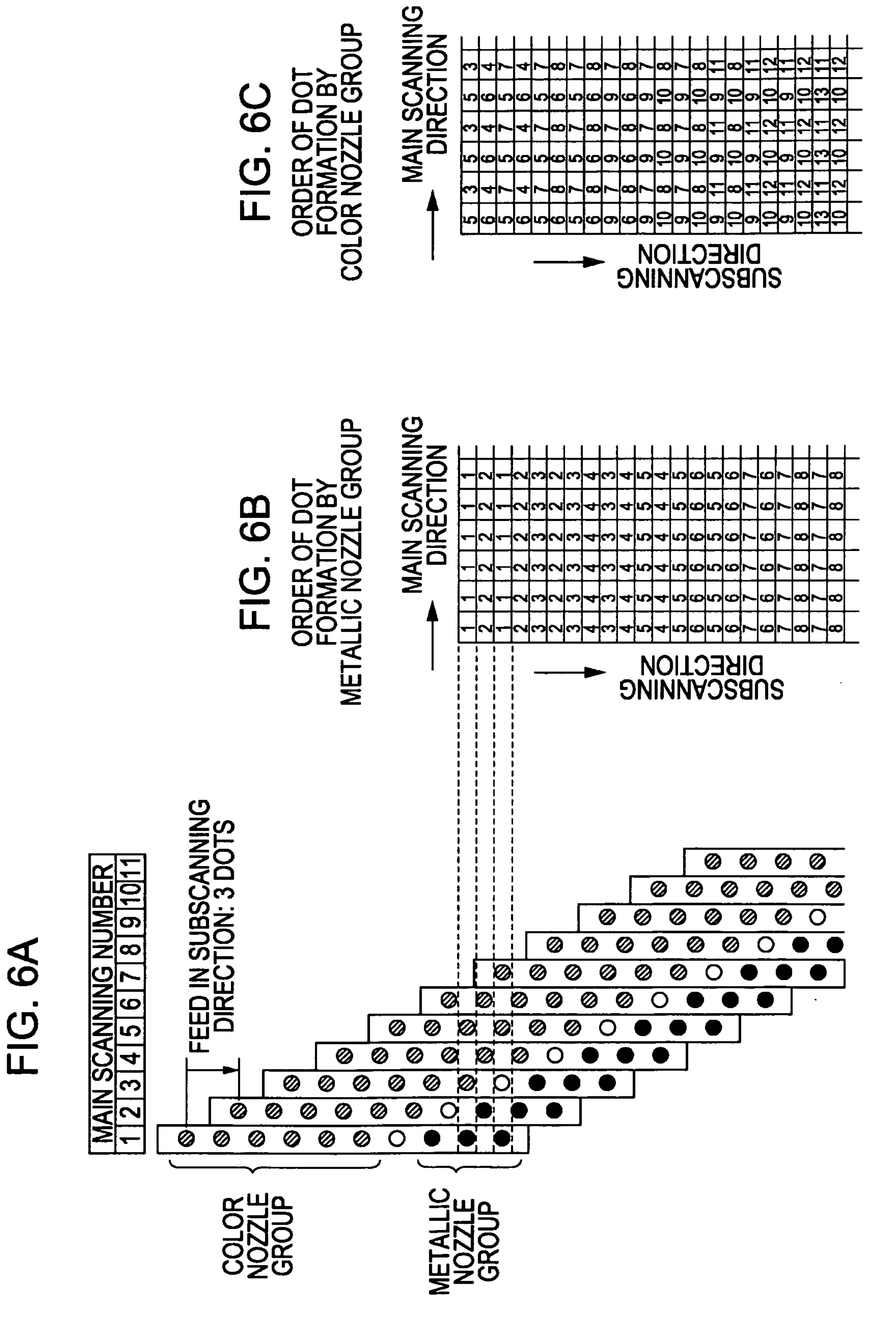
FIGS. 6A, 6B, and 6C show how dots are formed by the printer 200.

FIGS. 6A, 6B, and 6C shows how dots are formed by the printer 200. Although FIG. 4 shows five nozzle rows, in FIGS. 6A, 6B, and 6C, for convenience of illustration, a description will be given on the assumption that a metallic nozzle group and a color nozzle group are included in the same nozzle row. FIG. 6A shows change of position of a nozzle row in the subscanning direction (transport direction) in the first to eleventh main scanning. As shown, in this embodiment, after every main scanning, a printing medium is transported by three dots in the subscanning direction.

When the arrangement of nozzles and the feed of the printing medium are as described above, metallic dots are formed on the printing medium by the metallic nozzle group in the order shown in FIG. 6B. FIG. 6B shows when each dot on the printing medium is formed. As shown in FIG. 6B, in this embodiment, in the metallic area, a maximum of three rasters are formed at intervals of one raster in the subscanning direction in a single main scanning. After one main scanning is finished, the nozzle row is transported by three dots in the subscanning direction. Therefore, between the second and third rasters formed, the first raster of the next main scanning is formed. Simultaneously printing a plurality of rasters at intervals is referred to as interlace scanning. By performing this interlace scanning, periodic banding can be prevented from occurring in the metallic area.

In this embodiment, the manner of dot formation differs between the metallic area and the color area. FIG. 6C shows the order in which color dots are formed by the color nozzle group. As shown, in this embodiment, in the color area, dots in odd positions from the left and dots in even positions from the left in one raster are formed by different scanning. That is, when metallic dots are formed, one raster is formed by performing main scanning once, whereas when color dots are formed, one raster is completed by performing main scanning twice. Completing one raster by performing main scanning a plurality of times is referred to as "overlap scanning." By this overlap scanning, in this embodiment, for the color area, a maximum of six rasters are formed at intervals of one raster by performing main scanning twice. By performing overlap scanning, periodic banding can be more effectively prevented from occurring than in interlace scanning.

FIGS. 6B and 6C show printing areas located at the same position on the printing medium. As can be seen from FIGS. 6B and 6C, after a dot of metallic ink is formed at a position, a dot of color ink can be formed at the same position in the second to sixth main scanning from the main scanning in which the dot of metallic ink is formed. That is, in this embodiment, since the metallic nozzle group passes over a printing medium earlier than the color nozzle group, a dot of metallic ink is formed earlier than a dot of color ink.

As described above, according to this embodiment, a metallic dot is formed earlier than a color dot. Therefore, a color dot is not covered by a metallic dot, and a color dot can excellently develop its color. In addition, since a metallic dot is formed first, drying of the metallic dot can be promoted. Therefore, both metallic ink and color ink can excellently develop their colors. In addition, since, in this embodiment, unused nozzles are provided between the metallic nozzle group and the color nozzle group, the timing to eject color ink can be delayed. As a result, drying of metallic ink can be further promoted.

Since, in this embodiment, metallic ink can be ejected independently of and earlier than color ink, there is no need to allocate many nozzles to metallic ink. Therefore, many nozzles can be allocated to color ink. As a result, printing speed can be improved. In addition, since many nozzles can be allocated to color ink, the number of unused nozzles can be reduced. As a result, nozzles formed in the head can be efficiently used.

In this embodiment, for the metallic area, a raster is formed by performing main scanning once, and for the color area, a raster is formed by performing main scanning twice. Therefore, the printing speed in the metallic area can be improved. In addition, performing such scanning can make banding in the area in which printing is performed using color ink less likely to occur than in the area in which printing is performed using metallic ink.

D. Other Embodiments of Nozzle Arrangement

In the above-described embodiment, as shown in FIG. 4, 10 nozzles are provided for each color of ink. Of 10 nozzles, the first three nozzles that pass over a printing medium are used at the time of printing. However, examples of the arrangement and allocation of nozzles are not limited to this. Other embodiments of nozzle arrangement will hereinafter be described.

FIGS. 7 to 17 show variations of nozzle arrangement and print examples. In the example shown in FIG. 7, a nozzle row for metallic ink and nozzle rows for color ink each have eight nozzles, and the nozzle rows are arranged in such a manner that the nozzle row for metallic ink passes over a printing medium earlier than the nozzle rows for color ink. That is, the head of the example shown in FIG. 7 has no unused nozzles and has only nozzles to be used.

Figure 7:
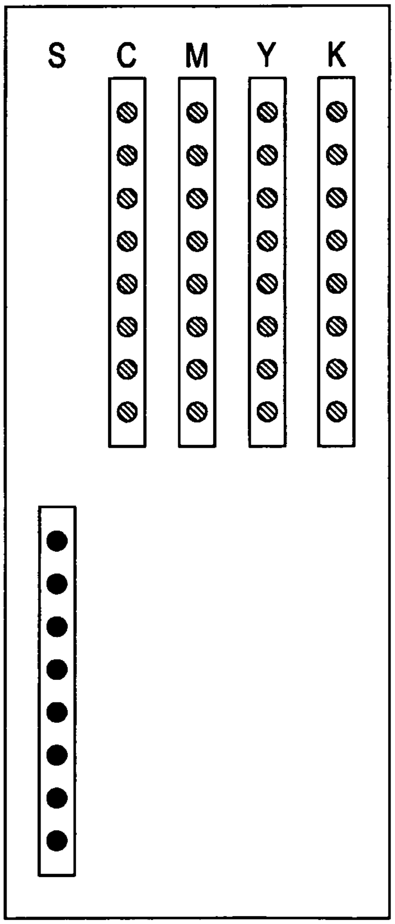
FIG. 7 shows a variation of nozzle arrangement.
Figure 8:
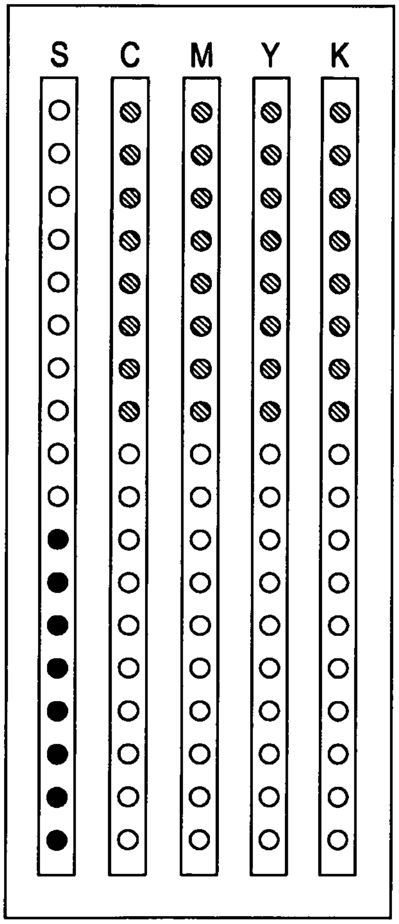
FIG. 8 shows a variation of nozzle arrangement.

In the head 241 shown in FIG. 8, each nozzle row has 18 nozzles. For the nozzle row of metallic ink, of 18 nozzles, the first eight nozzles that pass over a printing medium are used at the time of printing, and the other 10 are not used. On the other hand, for the nozzle rows of color ink, of 18 nozzles, the first 10 nozzles that pass over a printing medium are not used, and the other eight are used. Thus, in every nozzle row, the ninth and tenth nozzles from the first nozzle that passes over a printing medium are not used. As a result, the arrangement of nozzles to be used is the same as in the example shown in FIG. 7.

Figure 9:
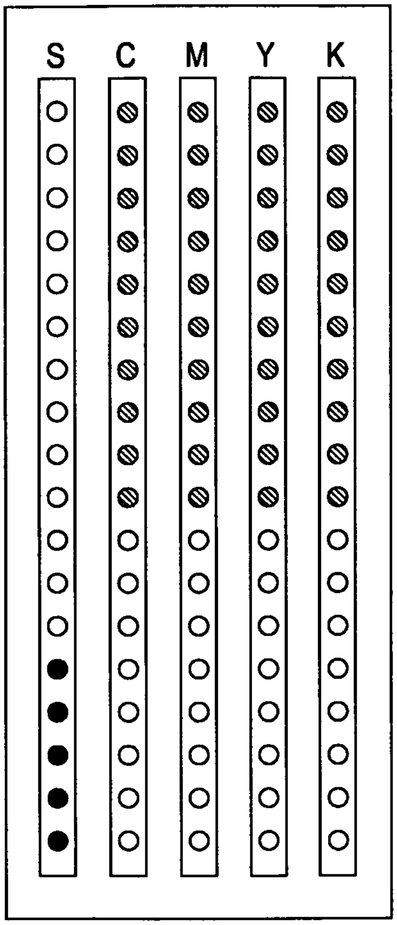
FIG. 9 shows a variation of nozzle arrangement.

In the head 241 shown in FIG. 9, each nozzle row also has 18 nozzles. For the nozzle row of metallic ink, of 18 nozzles, the first five nozzles that pass over a printing medium are used at the time of printing, and the other 13 are not used. On the other hand, for the nozzle rows of color ink, of 18 nozzles, the first eight nozzles that pass over a printing medium are not used, and the other 10 are used. Thus, in every nozzle row, the sixth to eighth nozzles from the first nozzle that passes over a printing medium are not used.

In the case of the nozzle arrangement shown in FIGS. 7 to 9, a metallic dot can also be formed earlier than a color dot, and therefore the same effects as those in the above-described embodiment can be obtained.

Figure 10:
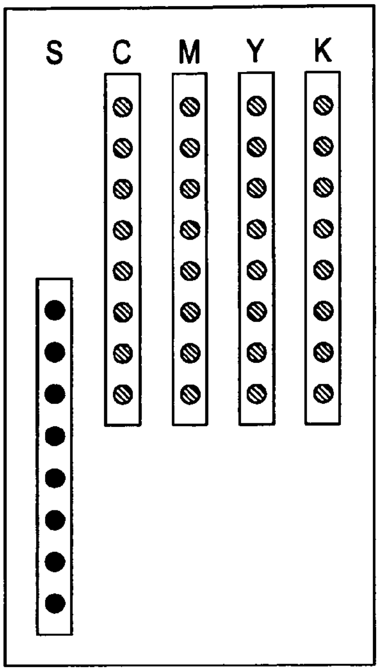
FIG. 10 shows a variation of nozzle arrangement.
Figure 11:
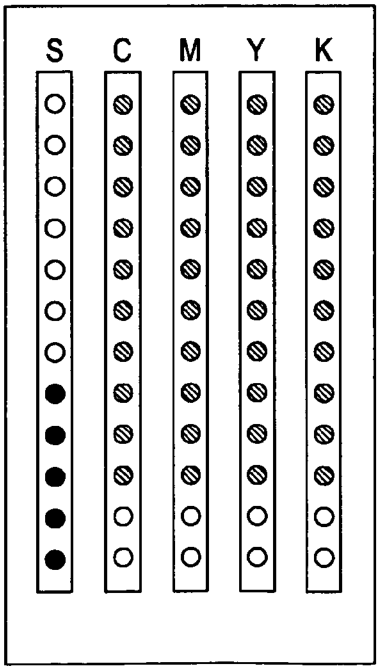
FIG. 11 shows a variation of nozzle arrangement.
Figure 12:
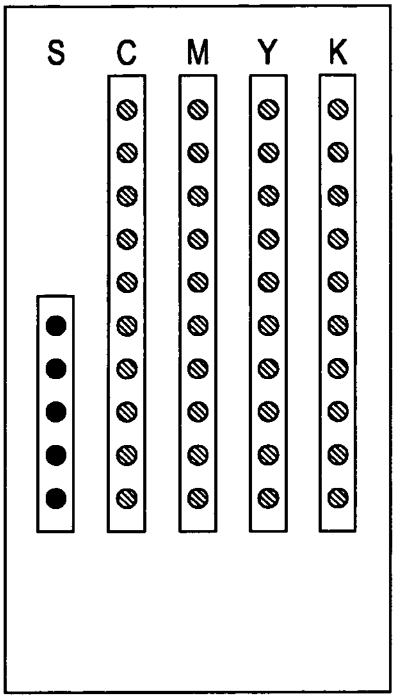
FIG. 12 shows a variation of nozzle arrangement.

FIGS. 10 to 12 show examples in which at least some of the nozzles that eject metallic ink are located at the same position in the subscanning direction as some of the nozzles that eject color ink. In the example shown in FIG. 10, of eight nozzles that eject metallic ink, the last three nozzles that pass over a printing medium are located at the same position in the subscanning direction as some of the nozzles that eject color ink. In the example shown in FIG. 11, of five nozzles that eject metallic ink, the last three nozzles that pass over a printing medium are located at the same position in the subscanning direction as, of ten nozzles that eject color ink, the first three nozzles that pass over a printing medium. In the example shown in FIG. 12, five nozzles that eject metallic ink are all located at the same position in the subscanning direction as, of ten nozzles that eject color ink, the first five nozzles that pass over a printing medium. In any one of the examples shown in FIGS. 10 to 12, in terms of the average of the number of nozzles, metallic ink is printed earlier than color ink. Although all or some of the nozzles that eject metallic ink eject ink at the same time as some of the nozzles that eject color ink, on the whole, metallic dots can be formed first. Therefore, the same effects as those in the above-described embodiment can be obtained.

Figure 13:
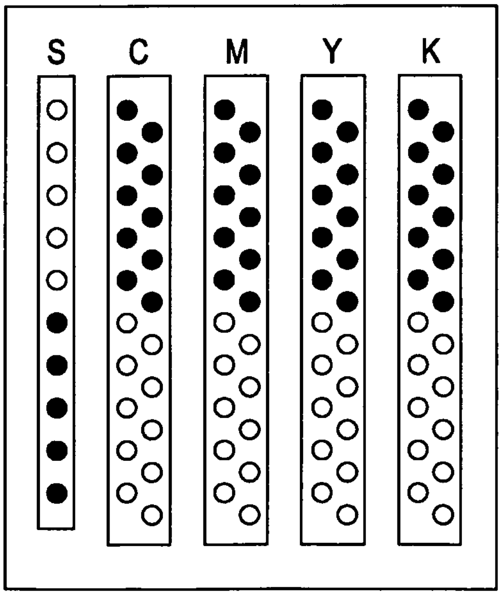
FIG. 13 shows a variation of nozzle arrangement.
Figure 14A:
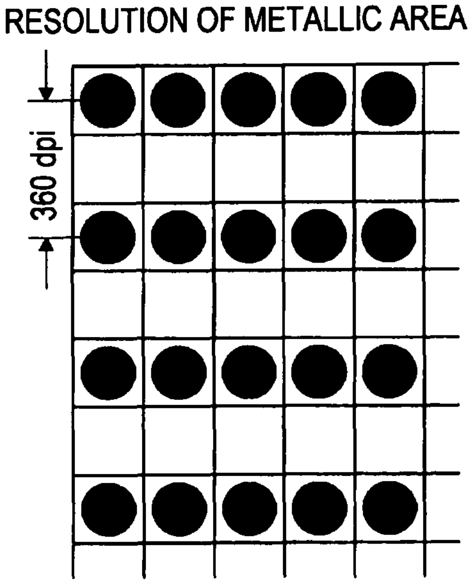
FIGS. 14A and 14B show the difference in output resolution between the metallic area and the color area.
Figure 14B:
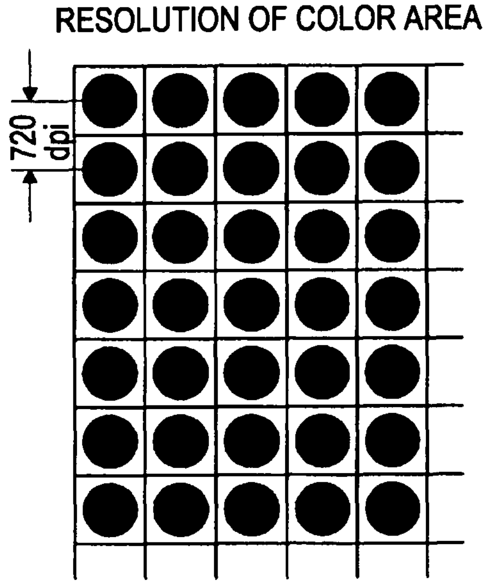

FIG. 13 shows an example in which the space between nozzles for metallic ink is twice the space between nozzles for color ink. For the nozzle rows of color ink, to narrow the space between nozzles, nozzles are arranged in a staggered manner in the subscanning direction. FIGS. 14A and 14B show an example in which dots are formed on a printing medium by the head 241 shown in FIG. 13. As shown in FIGS. 14A and 14B, when the head 241 shown in FIG. 13 is used, in the subscanning direction, the metallic area is half the output resolution of the color area. For the metallic area, although gloss is required, image quality such as fineness is less likely to be required. Therefore, reducing the output resolution in the metallic area as shown in FIGS. 14A and 14B has a small effect on the image quality. Reducing the output resolution in the metallic area can reduce the usage of metallic ink, which is relatively expensive. In the examples shown in FIGS. 13, 14A, and 14B, the resolution in the subscanning direction of the metallic area is reduced. Instead, the resolution in the main scanning direction may be reduced by making the number of times metallic ink is ejected smaller than the number of times color ink is ejected. Alternatively, both the resolution in the subscanning direction and the resolution in the main scanning direction may be reduced.

Figure 15:
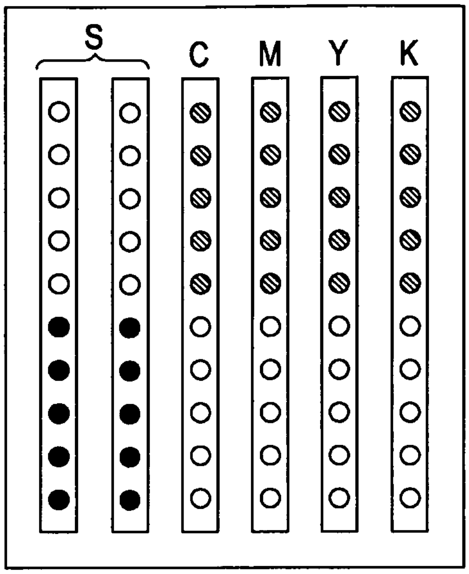
FIG. 15 shows a variation of nozzle arrangement.
Figure 16:
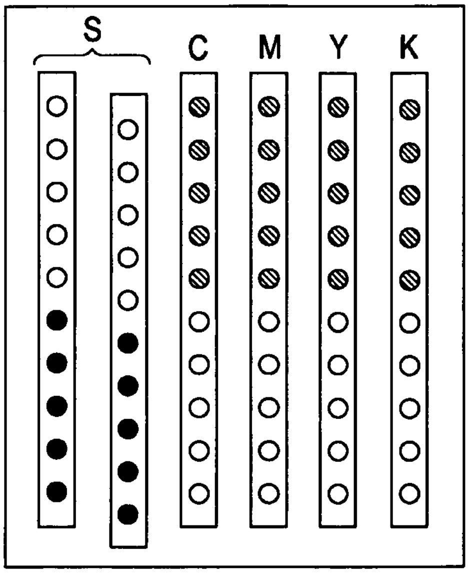
FIG. 16 shows a variation of nozzle arrangement.

FIGS. 15 and 16 show examples in which two nozzle rows for metallic ink are provided. Providing a plurality of nozzle rows for metallic ink makes it possible to form the metallic area at high speed. In the example shown in FIG. 16, the space between nozzles for metallic ink is half the space between nozzles for color ink. Such a nozzle arrangement increases the output resolution of the metallic area and enables high speed printing. When many nozzle rows are preliminarily provided in the head, if a plurality of nozzle rows for metallic ink are secured, on the whole, unused nozzles can be reduced.

Figure 17A:
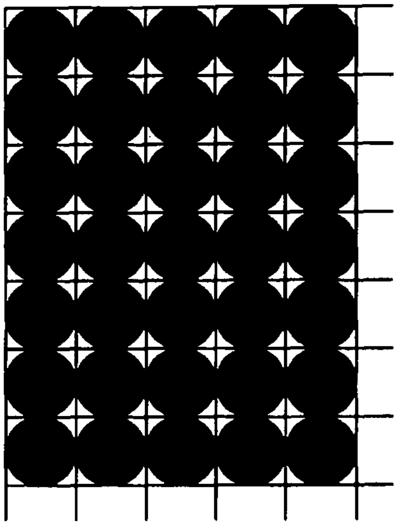
FIGS. 17A and 17B show an example in which the metallic area is printed in the largest dot size.
Figure 17B:
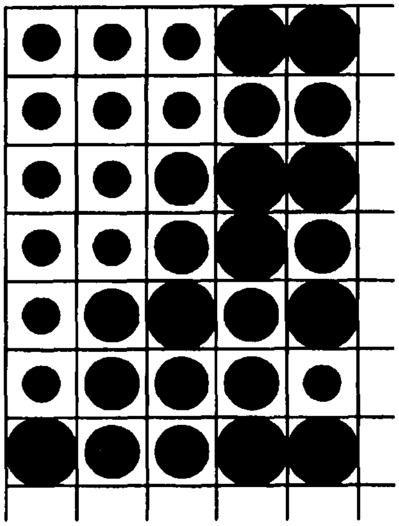
Figure 17B:
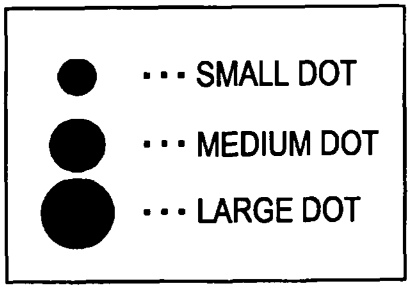

In the above-described various nozzle arrangements, when the metallic area is printed, metallic dots may be formed in a large size. In the printer 200 of the above-described embodiment, the amount of ink ejected from a nozzle can be adjusted by adjusting the voltage signal applied to the piezoelectric element in the nozzle. Thereby, different sizes of dots can be formed on a printing medium. For metallic ink, as shown in FIG. 17A, printing is always performed in the largest dot size. For color ink, as shown in FIG. 17B, halftone processing using small dots, medium dots, and large dots is performed, and thereby high quality printing is performed. By printing the metallic area using large dots, the gloss in the metallic area can be improved. For example, when the output resolution of the metallic area is reduced as shown in FIG. 14A, if the size of metallic dots is maximized, due to dot gain, metallic ink can be intentionally made to run. Thus, the metallic area can be printed in such a manner that the reduction in output resolution is compensated for.

Although various embodiments of nozzle arrangement are described above, the nozzle arrangements shown, for example, in FIGS. 7, 10, and 12 are special nozzle arrangements and therefore require developing of a new head. However, in the case of the nozzle arrangement shown in FIG. 8, 9, or 11, an existing ordinary print head can be used just by determining the positions of nozzles to be used. Therefore, there is no need to newly design a special head. In addition, if nozzles are arranged as shown in FIG. 8, 9, or 11, for example, a print mode in which metallic ink is not used can be provided. In this case, normal printing using color ink can be performed using all nozzles. Since all nozzles can be used, the printing speed is comparable to that of a normal printer. In addition, if nozzles are arranged as shown in FIG. 8, 9, or 11, an ink change system can be used that can switch between metallic ink and another ink (ordinary color ink or special color ink such as light cyan, light magenta, red, green, or blue ink). Thereby, a printer can be provided that can use special ink instead of one of the ordinary inks and special color inks only when the user wants to use special ink such as metallic ink.

E. Modifications

Although various embodiments of the invention are described above, the invention is not limited to these embodiments. It goes without saying that various configurations can be adopted without departing from the spirit of the invention. For example, the following modifications can be made.

Modification 1

In the above-described embodiments, printing using metallic ink is performed in the printing system 10 including the computer 100 and the printer 200. Instead, the printer 200 itself may input image data from a digital camera or a memory card and perform printing using metallic ink. That is, the CPU in the control circuit 260 of the printer 200 may perform the same processing as the above-described printing processing and thereby perform printing using metallic ink.

Modification 2

In the above-described embodiments, it is assumed that white printing paper is used as a printing medium. Therefore, printing is performed using metallic ink first, and then printing is performed using color ink. If it is assumed that a transparent film is used as a printing medium and this film is viewed from the side opposite to the print side, printing using color ink may be performed prior to printing using metallic ink. In this case, for example, in the nozzle configuration shown in FIG. 4, the metallic nozzle group is disposed in the upper part of the figure, and the color nozzle group is disposed in the lower part of the figure.

Modification 3

In the above-described embodiments, printing is performed using metallic ink and color ink. Instead of metallic ink, white ink or transparent ink may be used. When transparent ink is used for the purpose of protecting the print side or making the print side glossy, the printing using transparent ink needs to be performed after the printing using color ink. Therefore, in this case, in the nozzle configuration shown in FIG. 4, the group of nozzles that eject transparent ink is disposed in the upper part of the figure, and the color nozzle group is disposed in the lower part of the figure.

Modification 4

In the above-described embodiment, it is assumed that the positions of nozzles that eject metallic ink or color ink are fixed. However, the user may select nozzles to be used from a plurality of preliminarily provided nozzles. Specifically, for example, in the setting screen of the printer driver 24, the user may select the arrangement of nozzles that eject metallic ink and the arrangement of nozzles that eject color ink from a plurality of variations. Thus, printing can be performed by a nozzle arrangement selected by the user from the nozzle arrangements shown in FIGS. 8, 9, 11, and 12.

Modification 5

The printer 200 of the above-described embodiments is a serial printer that performs printing by moving the head 241 in the main scanning direction and subscanning direction. Instead, a line printer may be used that has a head with a width corresponding to the width of a printing medium, the head having many nozzles covering the width of the printing medium.

What is claimed is:

1. A printing apparatus that forms an image with dots of metallic ink including a metallic pigment and dots of color ink including a color pigment on a printing medium such that the dots of metallic ink develop color of the metallic pigment on the printing medium and the dots of the color ink develop color of the color pigment on the printing medium, at least some of the dots of the color ink being superimposed on the dots of the metallic ink, or the dots of the metallic ink being superimposed on at least some of the dots of the color ink, the printing apparatus comprising:

a head having at least one metallic ink nozzle that ejects the metallic ink and at least one color ink nozzle that ejects the color ink;

a transport mechanism that transports the printing medium relative to the head; and a print control section that controls the head and the transport mechanism, thereby printing the image on the printing medium using the metallic ink and color ink, and a main scanning mechanism that drives the head in a main scanning direction perpendicular to the direction in which the printing medium is transported, wherein the at least one metallic ink nozzle and the at least one color ink nozzle are offset from each other along the direction in which the printing medium is transported and are arranged in the order in which the dots of metallic ink and dots of color ink are superimposed;

wherein the head has at least one nozzle row for the metallic ink and at least one nozzle row for the color ink, each nozzle row including a plurality of nozzles arranged in the direction in which the printing medium is transported, some of the nozzles in the at least one nozzle row for the metallic ink are used as the at least one metallic ink nozzle and form a metallic ink nozzle group, some of the nozzles in the at least one nozzle row for the color ink are used as the at least one color ink nozzle and form a color ink nozzle group, and the metallic ink nozzle group and the color ink nozzle group are offset from each other along the direction in which the printing medium is transported and are arranged in the order in which the dots of metallic ink and the dots of color ink are superimposed;

wherein the head has a larger number of nozzle rows for the metallic ink than nozzle rows for the color ink;

wherein the print control section makes the manner of dot formation in an area in which printing is performed using the metallic ink different from the manner of dot formation in an area in which printing is performed using the color ink;

wherein the print control section is capable of superimposing scanning in which the main scanning mechanism makes the head perform main scanning a plurality of times to form a raster of dots; and wherein the print control section makes the number of times of main scanning in forming a raster of dots using the metallic ink smaller than the number of times of main scanning in forming a raster of dots using the color ink.

2. The printing apparatus according to claim 1, wherein the head has a different number of the at least one metallic ink nozzle than the at least one color ink nozzle.

3. The printing apparatus according to claim 2, wherein the head has a smaller number of the at least one metallic ink nozzle than the at least one color ink nozzle.

4. The printing apparatus according to claim 1, wherein the print control section makes the output resolution of the area in which printing is performed using the metallic ink lower than the output resolution of the area in which printing is performed using the color ink.

5. The printing apparatus according to claim 1, wherein the head can form different sizes of dots of the metallic ink and different sizes of dots of the color ink, and wherein the print control section forms large-sized dots in the area in which printing is performed using the metallic ink.

6. The printing apparatus according to claim 1, wherein the metallic ink includes an ink composition that includes at least the metallic pigment, an organic solvent, and a fixing resin.

7. The printing apparatus according to claim 1, wherein the metallic pigment comprises metallic foil pieces.

* * * * *